(12) United States Patent
Shimoda

(10) Patent No.: US 8,942,765 B2
(45) Date of Patent: Jan. 27, 2015

(54) COMMUNICATION TERMINAL DEVICE AND RECORDING MEDIUM

(75) Inventor: Nozomu Shimoda, Tokyo (JP)

(73) Assignee: NEC Casio Mobile Communications, Ltd., Kanagawa (JP)

( * ) Notice: Subject to any disclaimer, the term of this patent is extended or adjusted under 35 U.S.C. 154(b) by 873 days.

(21) Appl. No.: 13/018,707

(22) Filed: Feb. 1, 2011

(65) Prior Publication Data

US 2011/0189982 A1 Aug. 4, 2011

(30) Foreign Application Priority Data

Feb. 1, 2010 (JP) ................................ 2010-020739

(51) Int. Cl.
| H04B 1/38 | (2006.01) |
| H04M 1/00 | (2006.01) |
| H04M 3/42 | (2006.01) |
| H04W 4/18 | (2009.01) |
| H04W 4/06 | (2009.01) |

(52) U.S. Cl.
CPC ...... H04M 1/00 (2013.01); H04M 3/42 (2013.01); H04W 4/18 (2013.01); H04W 4/06 (2013.01)
USPC ...................................... 455/557; 455/414.1

(58) Field of Classification Search
CPC .................................. H04W 4/06; H04W 4/18
USPC ............................................. 455/414.2, 557
See application file for complete search history.

(56) References Cited

U.S. PATENT DOCUMENTS

| 7,096,038 | B1* | 8/2006 | Perrella | .......................... 455/557 |
| 2002/0032005 | A1* | 3/2002 | Yoshida | .......................... 455/41 |
| 2004/0204145 | A1* | 10/2004 | Nagatomo | .................... 455/566 |
| 2005/0054287 | A1* | 3/2005 | Kim | ............................ 455/3.05 |
| 2007/0229913 | A1* | 10/2007 | Aiso et al. | .................... 358/471 |

FOREIGN PATENT DOCUMENTS

| JP | 2002-344914 | 11/2002 |
| JP | 2005-086826 | 3/2005 |
| JP | 2006-085228 | 3/2006 |
| JP | 2007-267020 | 10/2007 |

OTHER PUBLICATIONS

JP Office Action dated May 7, 2013, with English translation; Application No. 2010-020739.

* cited by examiner

*Primary Examiner* — Charles Appiah
*Assistant Examiner* — Jaime Holliday
(74) *Attorney, Agent, or Firm* — Young & Thompson

(57) ABSTRACT

When a user performs a playback operation, an imaging unit starts taking images, and video data based on the image data obtained from that imaging is stored in a buffer of a memory unit. A control unit writes the video data stored in the buffer in a newly opened image file. When the capacity of the image file reaches a limit capacity, the control unit closes that image file and opens a new image file. The control unit also writes video data to the opened image file. The control unit creates information (image file information) for the generated image file and enters that information in an image management table. When a plurality of image files is generated, the control unit stores information indicating the playback order of the image files in the image management table.

10 Claims, 14 Drawing Sheets

FIG. 3

CAPACITY LIMIT TABLE

| CAPACITY LIMIT ID | PROCESS TYPE | COMMUNICATION DESTINATION | LIMIT CAPACITY |
|---|---|---|---|
| L_01 | RECEPTION | — | 3MB |
| L_02 | TRANSMISSION | @abc.com | 1MB |
| L_03 | TRANSMISSION | @def.com | 3MB |
| L_04 | TRANSMISSION | @ghi.com | 2MB |

IMAGE MANAGEMENT TABLE

| IMAGE ID | FILE NAME | BIT RATE | RECORDING TIME | FILE CAPACITY | RELATED FILES |
|---|---|---|---|---|---|
| I_01 | MImg0001.mp4 | 1Mbps | 3s | 3MB | I_02, I_03 |
| I_02 | MImg0002.mp4 | 1Mbps | 3s | 3MB | I_01, I_03 |
| I_03 | MImg0003.mp4 | 1Mbps | 1.5s | 1.5MB | I_01, I_02 |

202

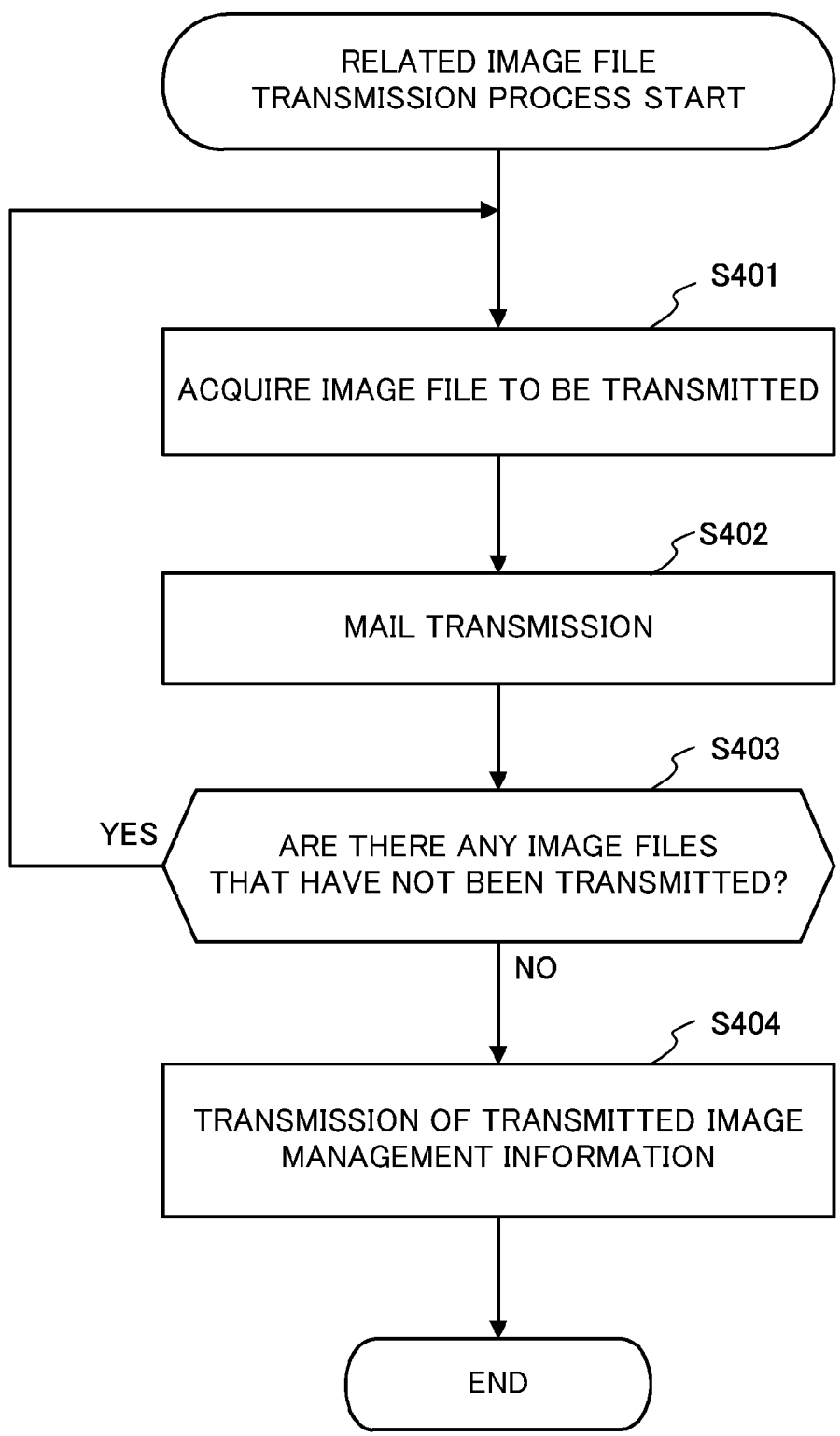

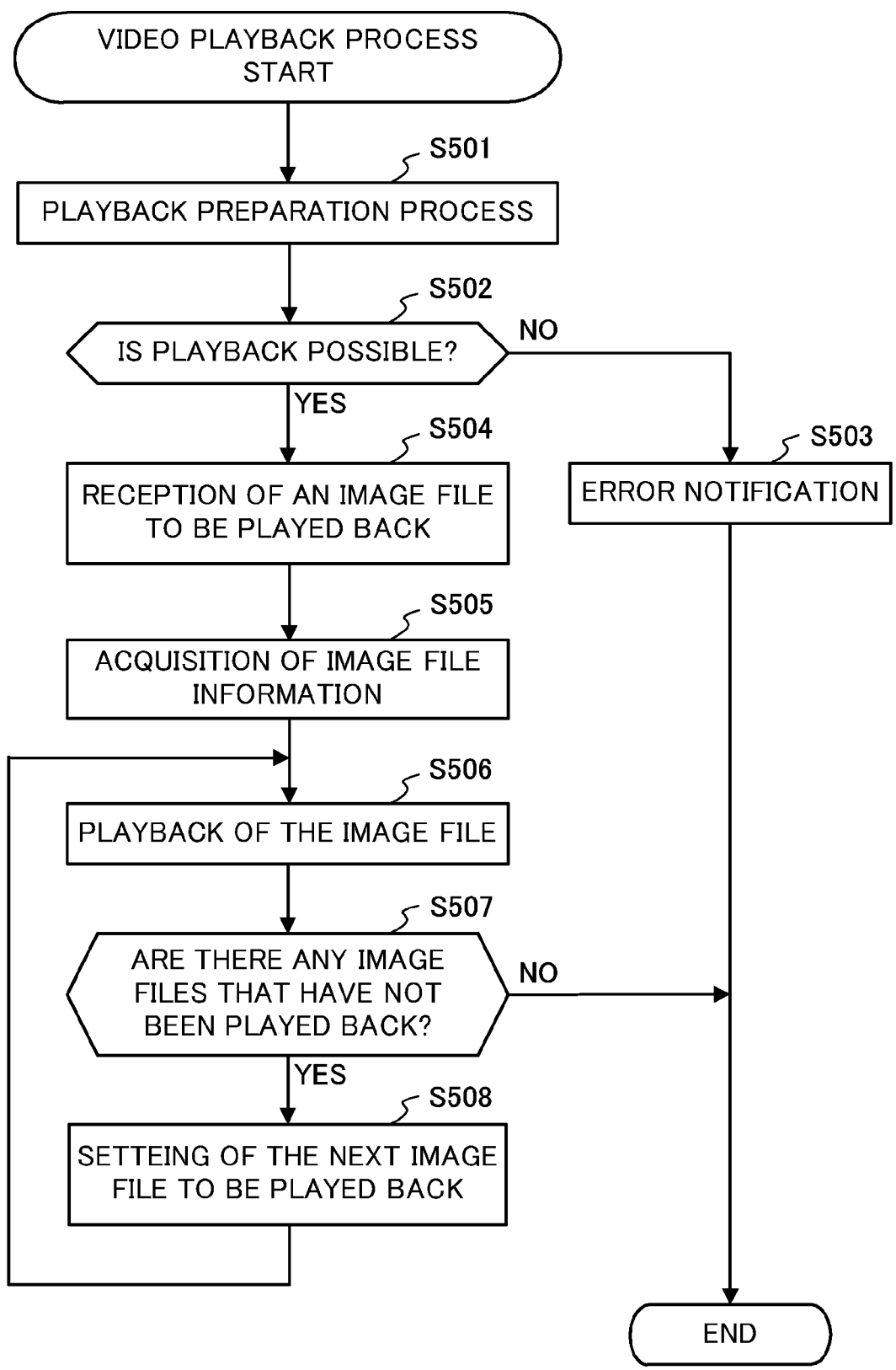

COMMUNICATION TERMINAL DEVICE AND RECORDING MEDIUM

INCORPORATION BY REFERENCE

This application is based on Japanese Patent Application No. 2010-020739 filed on Feb. 1, 2010 including specification, claims, drawings and summary. The disclosure of the above Japanese Patent Application is incorporated herein by reference in its entirety.

TECHNICAL FIELD

The present invention relates to technology of processing video by a communication terminal device.

BACKGROUND ART

Recently, communication terminal devices such as portable telephones that comprise a video recording function have widely infiltrated the marketa. Moreover, in recent years, through the advancement of imaging technology and video encoding technology, various technologies for enabling the recording of high-quality video using a communication terminal device have been disclosed, for example, the technology disclosed in Unexamined Japanese Patent Application KOKAI Publication No 2007-267020.

There are various uses of video recorded by communication terminal devices. For example, a video recorded by a communication terminal device may be played back by that communication terminal device. In addition, video recorded by a communication terminal device may be attached to electronic mail (hereafter, referred to as e-mail) and transmitted to another communication terminal device so that the video can be played back by another communication terminal device. In regards to this, a portable communication terminal having an e-mail function that transmits the most suitable amount of e-mail according to the allowable reception capacity of the destination terminal and the terminal's own allowable e-mail transmission capacity is disclosed in Unexamined Japanese Patent Application KOKAI Publication No. 2006-85228.

High-quality video can be referred to as an image having a large amount of code per bit. In other words, when comparing high-quality video and low-quality video recorded over the same amount of time, the file capacity of the high-quality video will be larger.

Furthermore, as disclosed in Unexamined Japanese Patent Application KOKAI Publication No. 2006-85228, there is generally a limit to the amount of e-mail that can be transmitted and received. Therefore, when transmitting or receiving an e-mail to which a high-quality video file is attached, the file capacity is large, so may infringe on the limits for the transmitting and receiving capacity, and accurate transmission of the video file may become impossible. In that case, the communication terminal device on the receiving side will not be able to accurately play back the original video.

Taking the situation above into consideration, an exemplary object of the present invention is to provide a communication terminal device and recording medium that are capable of preventing as much as possible the transmission and reception of recorded high-quality video from becoming impossible, and making it possible to accurately play back video on the receiving side.

SUMMARY

In order to accomplish the exemplary object above, a first exemplary aspect of the present invention is a communication terminal device that includes:

an imaging mean for taking an image of an object;
an e-mail transmission/reception mean for transmitting or receiving e-mail;
an operation mean for receiving operations from a user;
a video data storage mean for storing video data that is obtained as a result of taking images by the imaging mean;
a capacity limit information memory mean for storing capacity limit information wherein the maximum transmittable capacity when transmitting e-mail is set;
a video data writing mean that, when the operation mean receives a video recording instruction operation from a user, opens a new image file and writes video data that is stored in the video data storage mean to that image file;
an image memory mean for storing the image file;
an image file capacity monitoring mean for monitoring the capacity of the image file that is stored in the image memory mean;
a capacity judgment mean for determining whether or not the image file has reached the maximum transmittable capacity based on the monitoring results by the image file capacity monitoring mean; and
a first information generation mean that, when a plurality of image files are generated for one video, generates related image file information that stores information indicating the playback order of each image file, and stores the related image file information in the image memory mean; wherein
when the capacity judgment mean determines that the image file has reached the maximum transmittable capacity, the video data writing mean closes that image file and opens a new image file, then writes the video data that is stored in the video data storage mean to that opened image file.

A second exemplary aspect of the present invention is a communication terminal device that includes:

an operation mean for receiving operations from a user;
an image memory mean for storing a plurality of image files and related image file information wherein information indicating the playback order of the image files is stored;
a playback image file acquisition mean that, when the operation mean receives a video playback instruction operation from a user, acquires image files in order from the image memory mean for the video specified by the user based on the related image file information; and
a playback mean for playing back in order the image files that were acquired by the playback image file acquisition mean.

A third exemplary aspect of the present invention is a recording medium that is readable by a computer whereon a program is recorded that causes a computer to execute steps of:

starting imaging by an imaging mean when an operation mean receives a video recording instruction from a user;
storing video data that is obtained as a result of imaging in a video data storage mean;
opening a new image file and writing video data that is stored in the video data storage mean in the image file;
monitoring the capacity of the image file;
determining whether or not the capacity of the image file has reached the maximum transmittable capacity when transmitting an e-mail;
closing the image file and opening a new image file when it is determined that the capacity of the image file has reached the maximum transmittable capacity, and writing video data that is stored in the video data storage mean in the opened image file; and
generating related image file information, wherein information indicating the playback order of image files is stored, when a plurality of image files are generated for a video.

BRIEF DESCRIPTION OF THE DRAWINGS

These objects and other objects and advantages of the present invention will become more apparent upon reading of the following detailed description and the accompanying drawings in which:

FIG. 3 is a diagram illustrating an example of a capacity limit table;

FIG. 4 is a diagram illustrating an example of an image management table;

FIG. 11 is a flowchart illustrating the steps of a related image file transmission process;

FIG. 14 is a flowchart illustrating the steps of a video playback process.

EXEMPLARY EMBODIMENTS

In the following, preferred exemplary embodiments of the present are explained in detail with reference to the accompanying drawings.

Figure 1:
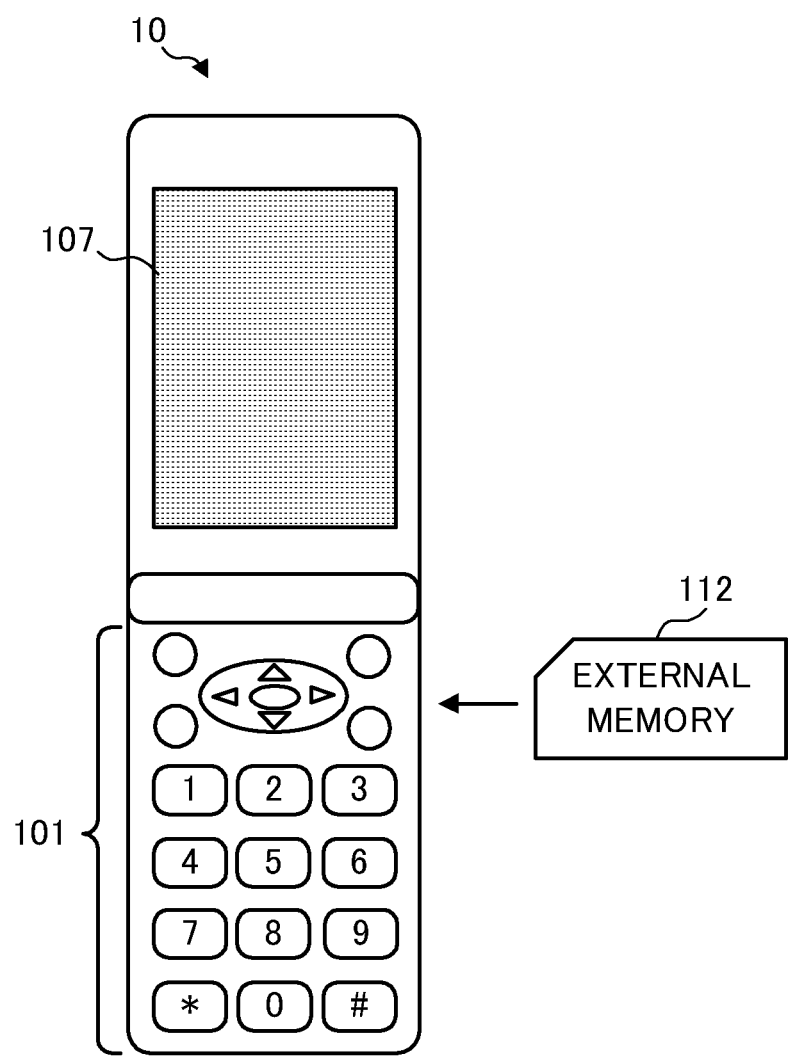
FIG. 1 is an external drawing of a communication terminal device of an exemplary embodiment of the present invention.
Figure 2:
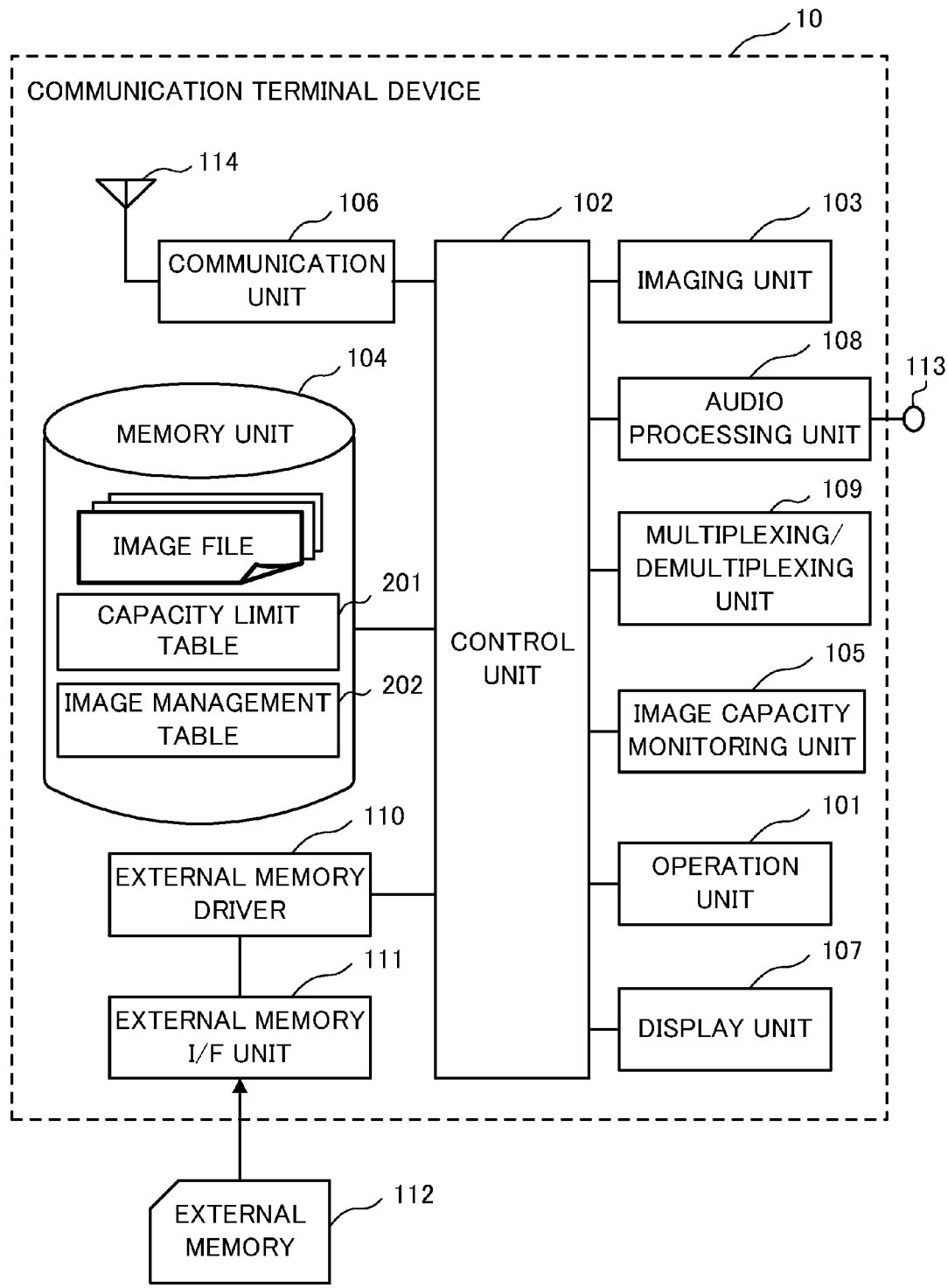
FIG. 2 is a block diagram illustrating the internal construction of the communication terminal device in FIG. 1.

FIG. 1 is a diagram illustrating the external appearance of a communication terminal device 10 of an exemplary embodiment of the present invention. FIG. 2 is a block diagram illustrating the internal construction of this communication terminal device 10. The communication terminal device 10 is a portable telephone, for example. The communication terminal device 10 of the present invention can also be a PHS (Personal Handy-phone System), PDA (Personal Digital Assistant), PC (Personal Computer) and the like.

The communication terminal device 10 comprises an operation unit 101, a control unit 102, an imaging unit 103, a memory unit 104, an image capacity monitoring unit 105, a communication unit 106, a display unit 107, audio processing unit 108, multiplexing/demultiplexing unit 109, external memory driver 110 and external memory I/F unit 111.

The operation unit 101 comprises various key buttons and the like. The operation unit 101 receives operation input from a user, and outputs a signal related to the received operation input to the control unit 102. The operation unit 101 receives operations from a user such as a power ON/OFF operation for that communication terminal device 10, operation input for inputting a telephone number or creating e-mail text, operation related to taking an image of an object and the like.

The control unit 102 comprises a CPU (Central Processing Unit) and main memory device and so on (neither of which is illustrated in the figure). The control unit 102 controls all of the units of the communication terminal device 10, as well as executes various processes described later such as recording or playing back a video, creating and transmitting an e-mail and the like based on various programs that are stored in the memory unit 104. In this exemplary embodiment, the control unit 102 functions as a video data writing unit, capacity judgment mean, first information generation mean, transmission image file acquisition mean, second information generation mean, transmission possibility judgment mean, playback image file acquisition mean, and playback unit.

The imaging unit 103 comprises a CCD (Charge Couple Device), A/D converter and the like. The imaging unit 103 takes an image and converts the obtained image from an optical signal to an analog electrical signal, as well as converts an analog electrical signal to a digital signal. For example, the imaging unit 103 takes an image of a person's face, landscape, text or the like as an object. The imaging unit 103 then converts the obtained image to a digital signal (image data) that can be handled by the control unit 102. The control unit 102 outputs the image data from the imaging unit 103 to the display unit 107 as necessary.

The display unit 107 comprises a display device such as a LCD (Liquid Crystal Display), organic EL (Electro-Luminescence) display or the like. The display unit 107 displays an image that was taken by the imaging unit 103. The display unit 107 also displays various information necessary for the user in using the functions of the communication terminal device 10 (for example, operating status such as power supply status, signal strength, remaining battery life, server connection status, reception data such as whether or not there is unread e-mail, entered telephone number or telephone number of an incoming call, contents of the sent or received e-mail, video or still images, Web screen when connected to the Internet, and the like).

When recording a video using the communication terminal device 10, the user starts the video recording operation by pressing specified key buttons of the operation unit 101 at desired timing while monitoring the image displayed on the display unit 107. The display unit 107 can also comprise two or more display devices such as a main and sub display device.

The memory unit 104 comprises a read/writeable non-volatile semiconductor memory such as a flash memory. The memory unit 104 stores image files, capacity limit table 201 and image management table 202 that have been acquired by the imaging unit 103 or acquired through communication with another communication terminal device. The memory unit 104 also stores other various data that are handled by the communication terminal device 10, application software such as a mailer (e-mail client) and programs for achieving the unique functions of the present invention.

The capacity limit table 201, as illustrated in FIG. 3, is a data table in which capacity limit information is entered. The capacity limit information correlates a capacity limit ID, process type, communication destination and limit capacity. The "process type" indicates whether the process whose capacity is limited is transmission or reception. The "communication destination" is information (the domain name in this exemplary embodiment) that identifies the communicating party.

The "limit capacity" indicates the capacity for which a limit is provided for each type of process or communication destination. More specifically, when the process type is reception, the limit capacity indicates the maximum receivable capacity of the communication terminal device 10 for one communication. When the process type is transmission, the limit capacity indicates the maximum transmitting capacity of the communication terminal device 10 for one communication for that communication destination.

In the example in FIG. 3, the limit capacity when the process type is reception is 3 MB regardless of the communication destination. However, the limit capacity when the process type is transmission differs depending on the communication destination, and is 1 MB when the domain name is "@abc.com", is 3 MB when the domain name is "@def.com" and is 2 MB when the domain name is "@ghi.com."

In the capacity limit table 201, in the initial state (at the time of shipping), only one record is entered (capacity limit information of capacity limit ID "L_01"). As e-mail is transmitted to or received from a new communicating destination, the control unit 102 automatically enters the capacity limit information for that communicating destination. The user may also enter capacity limit information for a new communicating destination via the operation unit 101. In addition, the user can update the entered capacity limit information.

Various items other than those above can be included in the capacity limit information. For example, an item that indicates the type of communication terminal device that the user at the communication destination is using can be included in the capacity limit information.

The image management table 202 is information for appropriately managing image files that are stored in the memory unit 104. The image management table 202 is referenced when performing some kind of process on an image file such as recording, copying, deletion, playback, transmitting and the like. In the case where there is no image management table 202 in the memory unit 104 when recording an image file, a new image management table 202 is created. Moreover, when there is already an image management table 202 in the memory unit 104, the contents of the image management table 202 are updated.

The image management table 202, as illustrated in FIG. 4, is a data table in which image file information is entered. The image file information correlates an image ID, file name, bit rate, recording time, file capacity and related files. In the example in FIG. 4, an image ID "I_01" is assigned to the image file that is entered at the top of the table, and the file name of that file is "MImg0001.mp4". Moreover, the recording time for that image file is 3 seconds, the bit rate is 1 Mbps and the file capacity is 3 MB. Furthermore, that image file is related to the file having image ID "I_02" and the file having image ID "I_03".

When a recorded series of videos are divided into a plurality of image files and stored, information about the other related image files is stored in "related file". More specifically, the image ID of other related image files are stored in "related file". In the example in FIG. 4, it can be seen that while recording a video, the limit capacity (3 MB) for the capacity of the image file having image ID "I_01" is reached, and the video data after that is stored in the image file having the image ID "I_02". Furthermore, it is seen that the capacity of the image file having image ID "I_02" is also reached to 3 MB, so the video data after that is stored in the image file having image ID "I_03".

In other words, the image file having image ID "I_01", and the image files having image ID "I_02" and image ID "I_03" are different files; however, they are files that form a series of videos. Therefore, these three image files should be handled as one video. The method of handling these image files will be described in detail later.

Returning to FIG. 2, the external memory I/F unit 111 is a hardware interface for connecting an external memory 112 such as a micro SD card or USB (Universal Serial Bus) memory. The external memory driver 110 performs control of the external memory I/F unit 111. For example, when there are many image files stored in the memory unit 104, there is a possibility that there will be insufficient empty space in the memory unit 104. Therefore, by having an external memory I/F unit 111 and external memory driver 110, the communication terminal device 10 can record an image file in an external memory 112, or can read an image file that is stored in the external memory 112. In order that the external memory 112 is not detached while the user is performing an operation, the external memory interface I/F unit 111 preferably is provided on the side of the frame of the communication terminal device 10.

The image capacity monitoring unit 105 operates while a video is being recorded, and monitors the capacity of video data or the capacity of an image file that is stored in real time in the buffer (not illustrated in the figure) of the memory unit 104. In addition, the image capacity monitoring unit 105 notifies the control unit 102 of the monitoring result.

The audio processing unit 108 compresses audio data that is inputted from an audio input/output terminal 113 and generates compressed audio data. Furthermore, the audio processing unit 108 supplies the compressed audio data to the multiplexing/demultiplexing unit 109. The audio processing unit 108 also expands compressed audio data that is supplied from the multiplexing/demultiplexing unit 109 and restores the audio data. Moreover, the audio processing unit 108 outputs restored audio data from the audio input/output terminal 113.

The multiplexing/demultiplexing unit 109 compresses image data that is obtained by the imaging unit 103 and generates compressed video data. Furthermore, the multiplexing/demultiplexing unit 109 multiplexes the compressed video data, and the compressed audio data that was generated by the audio processing unit 108, and generates video data (stream data). The multiplexing/demultiplexing unit 109 also reads image files from the memory unit 104 or external memory 112. In addition, the multiplexing/demultiplexing unit 109 demultiplexes video data that is stored in a read image file into compressed video data and compressed audio data. Furthermore, the multiplexing/demultiplexing unit 109 expands the demultiplexed compressed video data and restores the video data. Next, the multiplexing/demultiplexing unit 109 supplies the restored video data to the display unit 107, and supplies the demultiplexed compressed audio data to the audio processing unit 108.

The communication unit 106 is connected to an antenna 114 and so on. The communication unit 106 transmits data to or receives data from other communication terminal devices or information processing devices using a specified communication method for portable telephones. The communication unit 106 also acquires positional coordinates (longitude and latitude) of the communication terminal device 10 by transmitting data to and receiving data from a base station, location server, GPS (Global Positioning System) satellite and the like. Moreover, the communication unit 106 performs communication processing in order for the communication terminal device 10 to access the Internet. The communication unit 106 can be constructed such that communication is possible using a plurality of communication methods such as CDMA (Code Division Multiple Access), EV-DO (Evolution Data Only), wireless LAN (Local Area Network) and the like.

The functions of the image capacity monitoring unit 105, audio processing unit 108, multiplexing/demultiplexing unit 109 and external memory driver 110 can be achieved through hardware by using special circuits such as an ASIC (Application Specific Integrated Circuit). In addition, the functions of the image capacity monitoring unit 105, audio processing unit 108, multiplexing/demultiplexing unit 109 and external memory driver 110 can be achieved through logical processing by the control unit 102 executing a program that is stored in the memory unit 104.

Continuing, the video recording process that the communication terminal device 10 executes will be explained with reference to the flowchart in FIG. 5.

The video recording process is started by the user performing an operation using the operation unit 101 to start recording video. More specifically, the user can start the video recording process by selecting an item such as [camera]→[record video] from a menu screen that is displayed on the display unit 107. The video recording process can be started immediately by pressing a specific key button such as a short-cut key.

The control unit 102 responds to the input of the operation from the user to start recoding video, and executes a preparation process (preparation process for recording) for starting the video recording process (step S101). As the recording preparation process, the control unit 102 executes processes for initializing all of the various devices necessary for recording video, initializing the buffer (cache) of the memory unit 104 that stores video data, checking the empty capacity of the memory unit 104 and setting the bit rate. The control unit 102 also calculates the available video recording time based on the empty memory space and bit rate. Moreover, the control unit 102 displays the calculated available video recording time on the display unit 107.

Based on the results of the video recording preparation process above, the control unit 102 determines whether or not video recording is possible (step S102). Video recording is not possible, when for example, there is no empty memory space in the memory unit 104 for recording a new image file, or when a device that is necessary for recording a video cannot be used due to some kind of trouble. When video recording is not possible (step S102: NO), the control unit 102 notifies the user that video recording is not possible by displaying an error message on the display unit 107 such as "The memory is full, so that video recording is not possible" (step S103). When doing this, the control unit 102 may take into consideration convenience to the user and display a message of what action needs to be taken to treat the error such as "In order to record a video, delete all unnecessary data."

When video recording is possible (step S102: YES), the control unit 102 determines whether or not the user has performed an operation to start recording video (step S104). For example, the user adjusts the height and angle of the communication terminal device 10, the distance from the communication terminal device 10 to the object whose image is being taken, while viewing a video that is taken by the imaging unit 103 and displayed on the display unit 107. In addition, the user performs an operation to start recoding video at desired timing by operating a specific key or icon.

Figure 7:
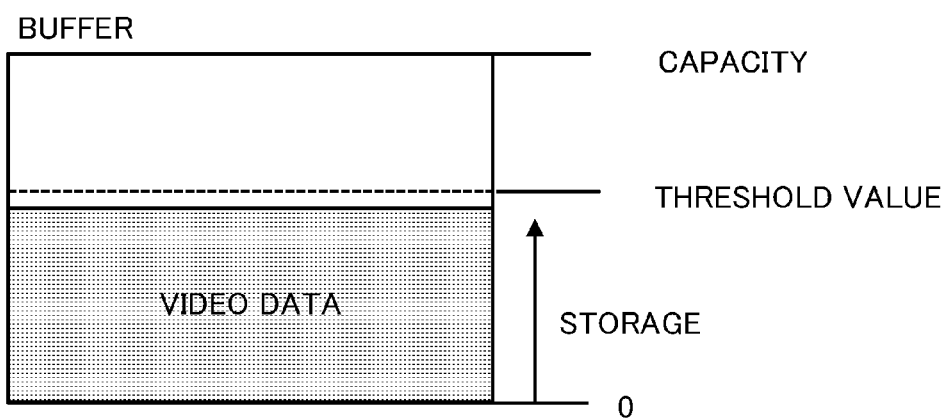
FIG. 7 is a diagram for explaining the storage of video data in a buffer.

When the user has performed an operation to start video recording (step S104: YES), the control unit 102 executes a recording process (described later) while storing video data that was generated by the multiplexing/demultiplexing unit 109 in the buffer of the memory unit 104 (step S105). FIG. 7 is a diagram illustrating an example of the state of video data being stored in the buffer. Here, the amount of data that can be stored per second differs according to the bit rate that was set at the start of video recording. The higher the bit rate is, the larger the amount of data is that can be stored in the buffer per second. FIG. 7 will be described in detail later.

When the user performs an operation to end video recording (video recording end operation) or the like, the control unit 102 ends the video recording process of step S105. In addition, the control unit 102 updates the image management table 202 (step S106). More specifically, the control unit 102 adds the image file information for the image files generated by that recording process to the image management table 202. At this time, in the case where there is no image management table 202 in the memory unit 104, the control unit 102 generates a new image management table 202 and writes the image file information for the newly generated image file in that image management table 202. This ends the video recording process.

Figure 6:
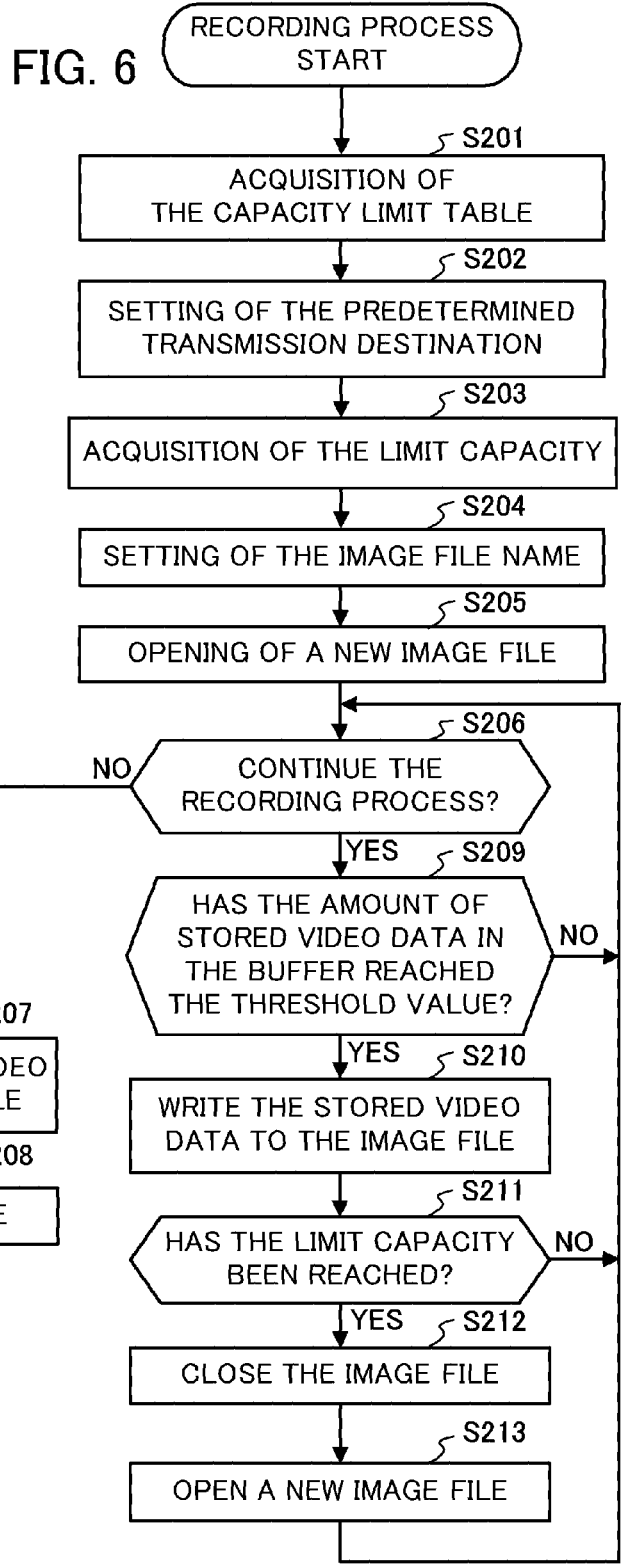
FIG. 6 is a flowchart illustrating the steps of a recording process.

Continuing, the recording process (step S105) will be explained in detail with reference to the flowchart in FIG. 6.

After the recording process has started, the control unit 102 acquires the capacity limit table 201 from the memory unit 104 (step S201). Next, the control unit 102 sets the predetermined transmission destination (step S202). The predetermined transmission destination is the scheduled communication destination for transmitting the image file of the video that is recorded in this recording process. The control unit 102 sets the communication destination that has the highest frequency of being used for transmitting and receiving e-mail within a specified period of time as the predetermined transmission destination. When there is a plurality of communication destinations having the same frequency of use and there is a difference in the limit capacity of the destinations, the control unit 102 can set the communication destination that has transmitted or received e-mail the most recently as the predetermined transmission destination. The control unit 102 also can set any of the communication destinations as the predetermined transmission destination according to priority that the user sets in advance for each communication destination.

Next, the control unit 102 references the capacity limit table 201 and acquires the limit capacity that corresponds to the predetermined transmission destination that was set (step S203). In the example in FIG. 3, when the domain of the predetermined transmission destination that was set is "@def.com", the limit capacity for transmission is 3 MB.

When e-mail has never been transmitted or received before and the communication history for e-mail is 0, the control unit 102 skips the process of step S202, and acquires the limit capacity by a different method from step S203. For example, the control unit 102 may acquire a value that was set in advance such as at the time of shipment for example, or a value that the user sets arbitrarily as the limit capacity. The control unit 102 can also acquire the limit capacity when the process type is "reception" (3 MB in FIG. 3). Moreover, before actual communication is performed, when the user has set a limit capacity in the capacity limit table 201 for each communication destination beforehand, the control unit 102 can acquire the minimum value from among the values in the table, or the average value as the limit capacity for transmission.

Continuing, the control unit 102 sets a name for the image file of the video to be recorded (step S204). The name of the image file is set according to predetermined naming rules. The control unit 102, for example sets the image file name according to naming rules that are predetermined in the communication terminal device 10, naming rules that are predetermined in each manufacturer, unified naming rules for maintaining playback compatibility among communication terminal devices 10 and the like. In this exemplary embodiment, the image file name of a newly opened image file is explained to be "MImg001.mp4".

The control unit 102 opens the new image file (MImg001.mp4) (step S205). By doing so, data can now be written to that image file.

The control unit 102 determines whether or not to continue the recording process (step S206). More specifically, the control unit 102 determines whether or not the user has performed an operation to stop video recording. When the user has performed an operation to stop video recording (step S206: NO), the control unit 102 stops storing video data in the buffer, and writes the remaining video data that is stored in the buffer at that time to the image file (for example MImg001.mp4) (step S207). After all of the unwritten video data has been written to the image file, the control unit 102 closes the opened image file (step S208), and ends the recording process.

On the other hand, when the user has not performed an operation to stop video recording (step S206: YES), the control unit 102 determines whether or not the amount of stored video data in the buffer has reached a preset threshold value based on the monitoring result by the image capacity monitoring unit 105 (step S209). The threshold value here (see FIG. 7) is a parameter that is used for determining whether or not stored video data has been written to an image file. The control unit 102 performs control so that video data is stored in a buffer until the amount of data has reached a threshold value, and then is written to an image file. For example, in the case where the buffer capacity is 2 MB and the threshold value is 1 MB, when the amount of video data that is stored in the buffer becomes 1 MB or greater, the stored video data is written to an image file.

As a result of the judgment above, when the amount of stored video data has reached the threshold value (step S209: YES), the control unit 102 writes that video data to an image file (for example MImg0001.mp4) (step S210). On the other hand, when the amount of stored video data has not yet reached the threshold value (step S209: NO), the control unit 102 repeats the process from step S206.

The reason for this kind of control is that writing video data to an image file after a certain amount of video data has been stored requires less instructions from the control unit 102 than successively writing video data that is stored in the buffer to an image file, so the processing load is reduced and processing can become more efficient and faster. Moreover, depending on the memory medium (flash memory, hard disk drive, various kinds of memory cards) on which an image file is recorded, or the file system, multiples of 32 KB of data can be written efficiently and fast. Taking this into consideration as well, it is also preferred that the control unit 102 writes video data to an image file after a certain amount of data has been stored. Of course this kind of control is not absolutely necessary, and control could be performed so that video data stored in the buffer is successively written to an image file. The threshold value can also be set to any arbitrary value as long as it is equal to or less than the buffer capacity (for example, 2 MB).

Figure 8:
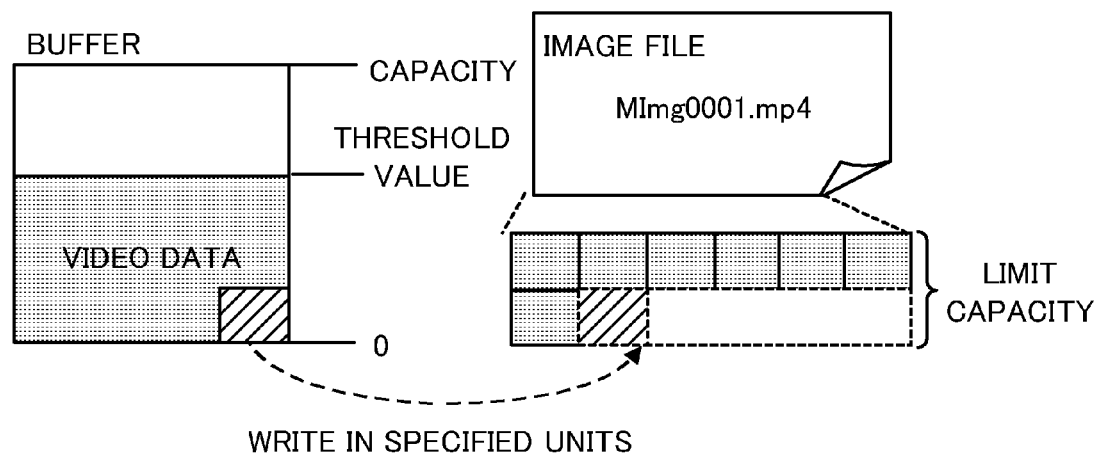
FIG. 8 is a diagram for explaining the writing of video data to an image file.

FIG. 8 is a diagram that conceptually illustrates writing from a buffer to an image file. FIG. 8 illustrates the case in which the amount of stored video data has reached the threshold value and so the video data is sequentially written to an image file (here the file is "MImg0001.mp4". Here, the unit for writing data to an image file is preferably a value that is set for the recording medium above such that the writing efficiency is good.

Returning to FIG. 6, the control unit 102 determines whether or not the image file capacity has reached the limit capacity that was acquired in step S203 (step S211). That is, the capacity of the image file is monitored by the image capacity monitoring unit 105 when the video data is being written, so that the control unit 102 performs this judgment based on that result. More specifically in this exemplary embodiment, the capacity limit is 3 MB, so that the control unit 102 determines whether or not the capacity of the image file has reached 3 MB. The control unit 102 can also determine whether or not the amount of video data written from the buffer to the image file has reached 3 MB.

When the judgment results are that the capacity of the image file has not reached the limit capacity (step S211: NO), processing is repeatedly executed from step S206.

Figure 9:
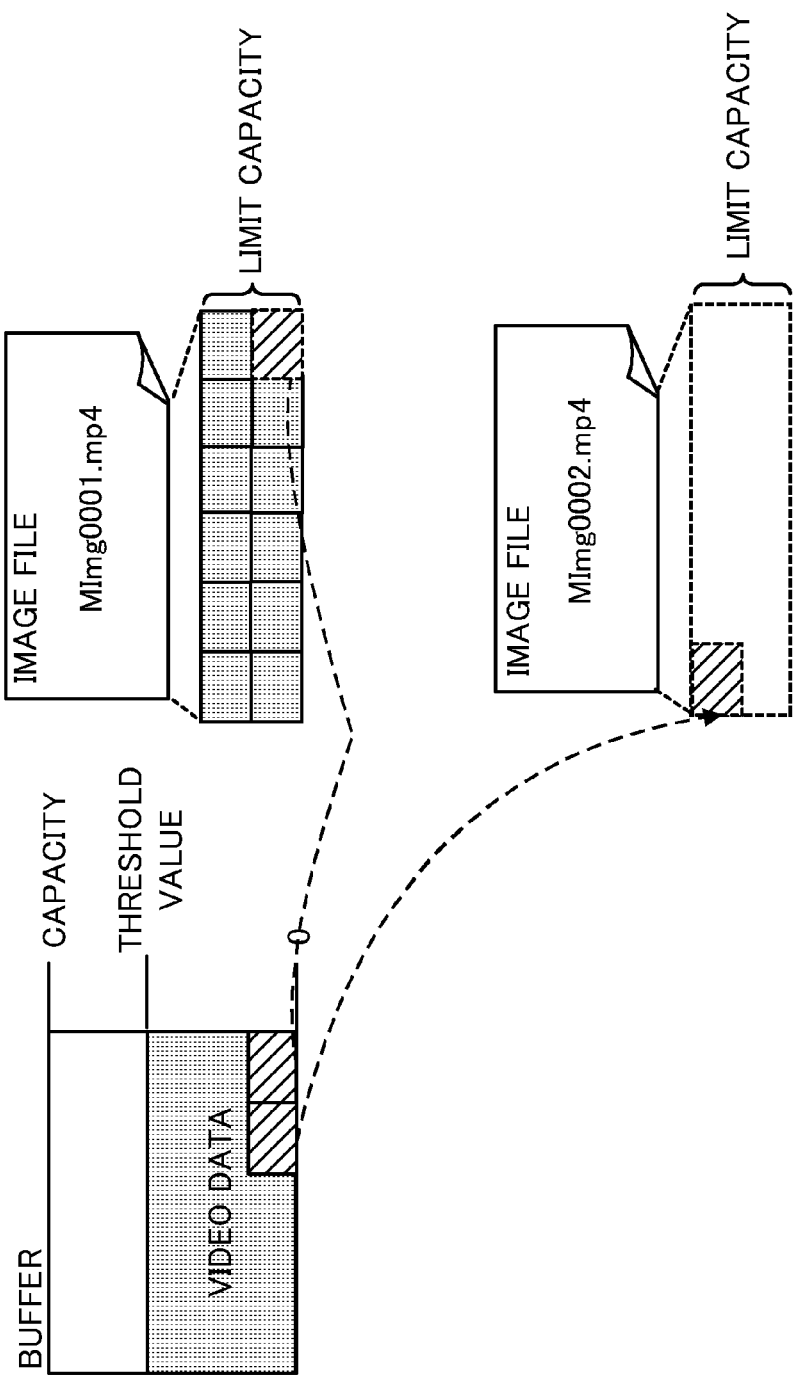
FIG. 9 is a diagram for explaining the exchange of image files.

On the other hand, when the capacity of the image file has reached the limit capacity (step S211: YES), the control unit 102 closes that image file (for example, "MImg0001.mp4") (step S212). In addition, in order to continue the recording processing, the control unit 102 opens a new image file (step S213). In this exemplary embodiment, the file name of this new image file is "MImg0002.mp4". After the new image file has been opened, the process is repeated from step S206. In FIG. 9, the capacity of the image file "MImg001.mp4" reaches the limit capacity (here the limit capacity is 3 MB) while the video data that is stored in the buffer is being written to the image file "MImg0001.mp4", so that the remaining video data that is stored in the buffer is written in a newly opened file "MImg0002.mp4".

After that, as long as the user does not perform an operation to end video recording (step S206: YES), the process above will be repeated. For example, as a result of the recording process continuing, when the capacity of the image file "MImg0002.mp4" reaches 3 MB (step S211: YES), the control unit 102 closes the file "MImg0002.mp4" (step S212). Moreover, the control unit 102 opens a new image file "MImg0003.mp4" (step S213) and writes the video data stored in the buffer to that image file "MImg0003.mp4" (step S210).

Figure 5:
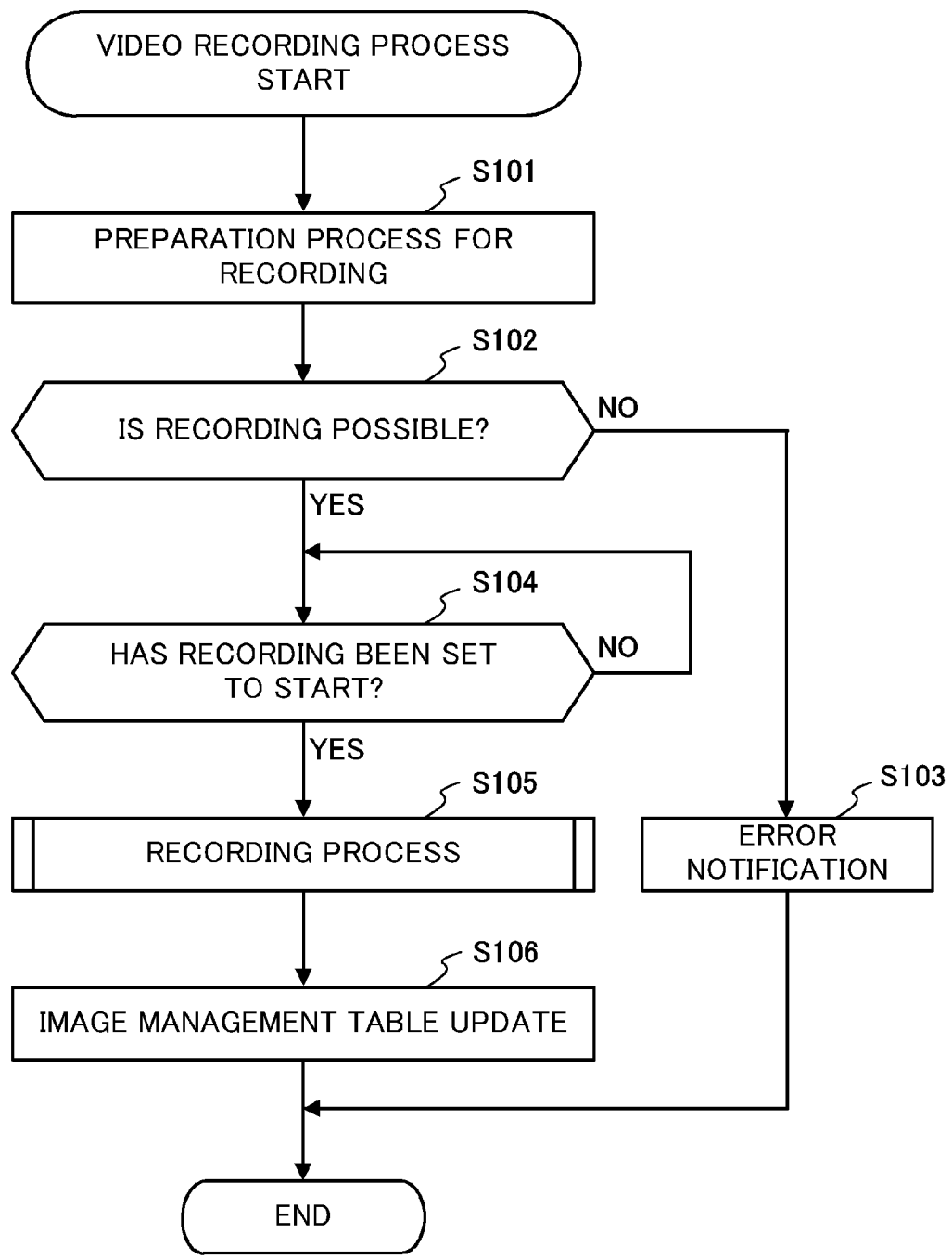
FIG. 5 is a flowchart illustrating the steps of a video recording process.

After the recording process above has ended, as described above, the control unit 102 updates the image management table 202 (step S106 in FIG. 5). For example, when recording a video and there is no image management table 202 in the memory unit 104, the control unit 102 creates a new image management table 202, and then writes the image file information for the generated image files (for example, "MImg001.mp4", "MImg0002.mp4" and "MImg003.mp4") (see FIG. 4).

As described above, the communication terminal device 10 can generate image files without infringing on the capacity limit during e-mail transmission.

Figure 10:
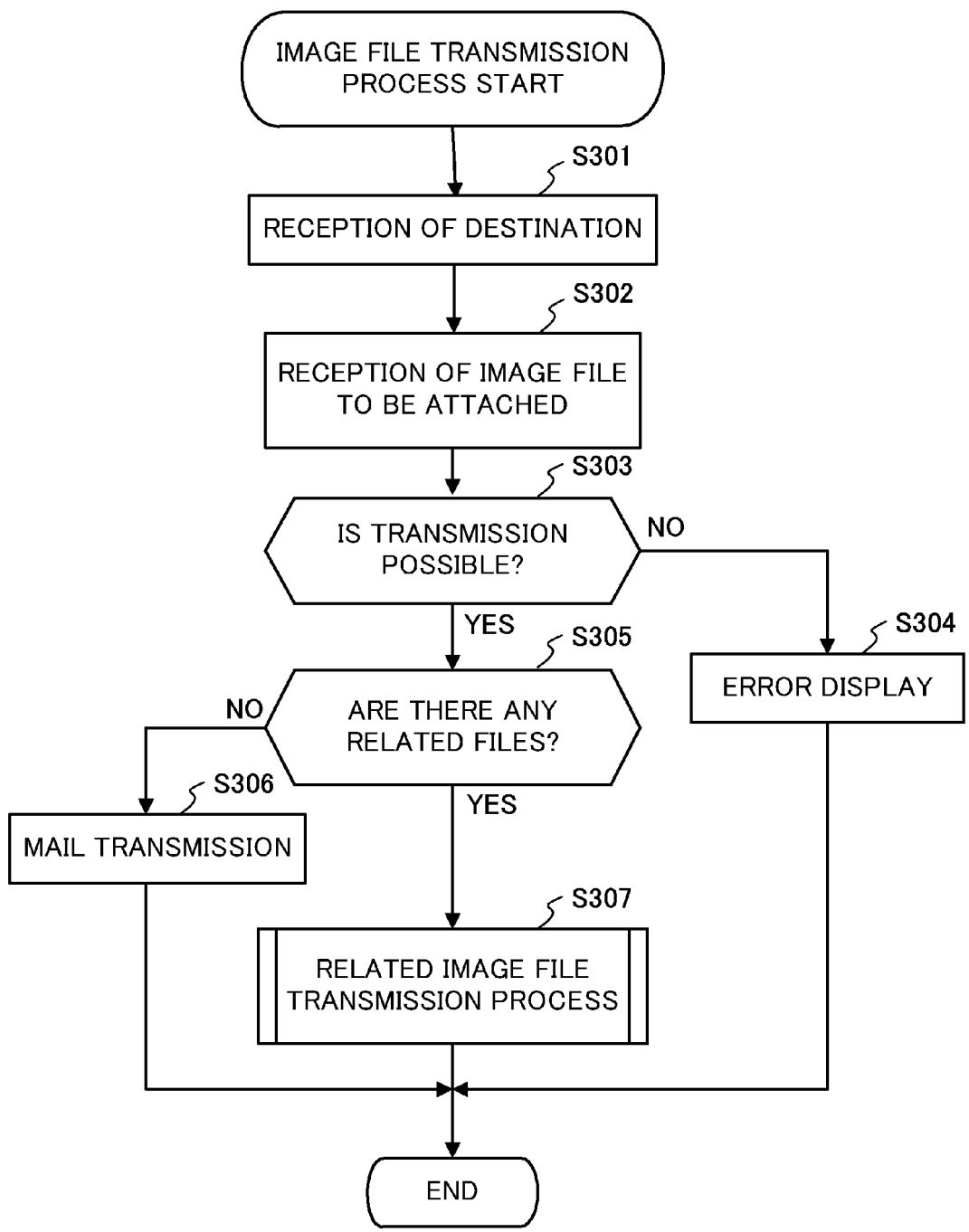
FIG. 10 is a flowchart illustrating the steps of an image file transmission process.

Continuing, the process performed when attaching an image file that was generated by the video recording process above to an e-mail and transmitting the e-mail (image file transmission process) will be explained with reference to the flowcharts in FIG. 10 and FIG. 11.

The user can start the image file transmission process by selecting an item from a menu screen such as [Mail]→[Create New]. It is also possible to start the image file transmission process immediately by pressing a certain predefined key such as a shortcut key. Particularly, the image file transmission process of this exemplary embodiment is different from normal e-mail transmission in that it is a process for transmitting e-mail to which a video is attached, and is a further a process for transmitting a video that comprises a plurality of image files. Therefore, providing a special shortcut key is convenient in that it enables the user to clearly distinguish this process from normal e-mail transmission, and prevents the user from becoming confused. After an instruction is inputted for starting this kind of image file transmission process, the control unit 102 starts the image file transmission process.

Figure 12A:
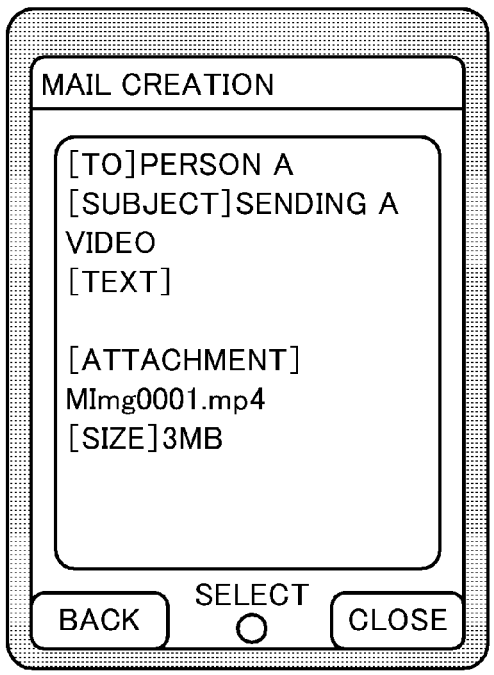
FIG. 12A is a diagram illustrating a display screen example before transmitting an image file.

The control unit 102 receives an e-mail transmission (destination) instruction from the user (step S301). Next, the control unit 102 receives an instruction from the user indicating the image file to be attached (step S302). For example, the control unit 102 displays a list of file names or thumbnails of the image files saved in the memory unit 104 on the display unit 107. The user selects the image file to be attached to the e-mail from among the image files displayed as attachment candidates. FIG. 12A is a drawing illustrating an example of the display screen of the display unit 107 after an image file has been selected.

Returning to FIG. 10, the control unit 102 determines whether or not the image file specified by the user can be transmitted to the destination (step S303). More specifically the control unit 102 references the image management table 202 and acquires the file capacity of the image file specified by the user. The control unit 102 also determines whether or not that file capacity is equal to or less than the limit capacity of the destination (communication destination) indicated in the capacity limit table 201. As a result, when transmission is not possible, or in other words, when the file capacity of the image file specified by the user exceeds the limit capacity of the destination (step S303: NO), the control unit 102 displays an error message on the display unit 107 (step S304) and ends this process (image file transmission process).

However, when transmission is possible, or in other words, when the file capacity of the image file that is specified by the user is equal to or less than the limit capacity of the destination (step S303: YES), the control unit 102 references the image management table 202 and determines whether or not there are other image files that are related to that image file (step S305), and when there are not any related image files (step S305: NO), the control unit 102 transmits the e-mail with the image file attached to the destination (step S306) and ends this process. The user can enter an e-mail title and text as necessary using the operation unit 101.

Figure 12B:
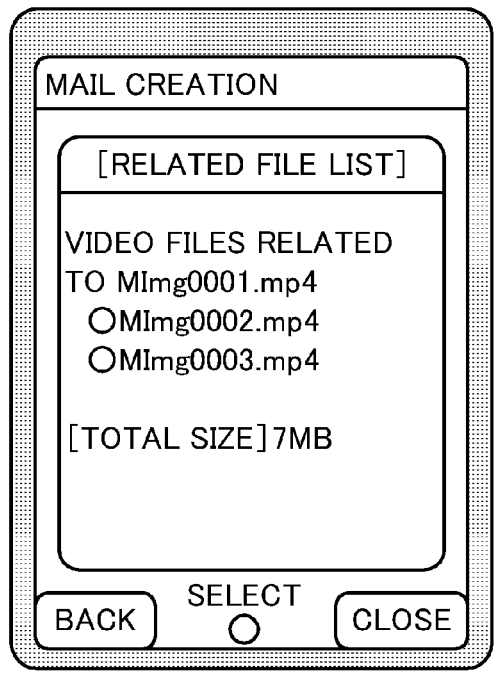
FIG. 12B is a diagram illustrating a display screen example before transmitting an image file.
Figure 12C:
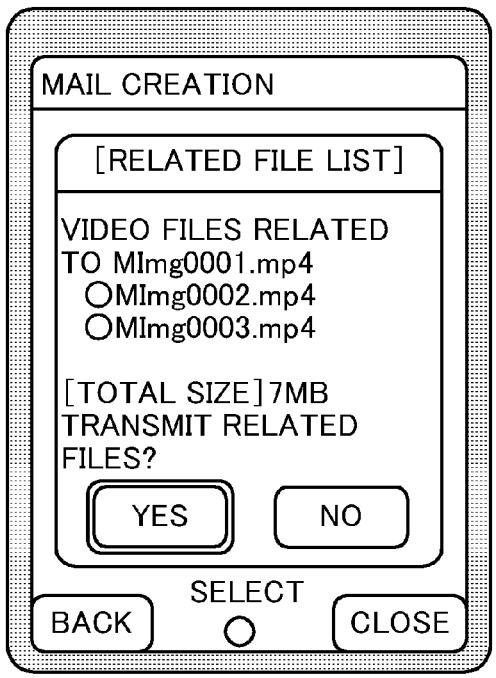
FIG. 12C is a diagram illustrating a display screen example before transmitting an image file.

In the case that there are related image files (step S305: YES), the control unit 102 executes a related image file transmission process (step S307). As illustrated in FIG. 12B, before executing the related image file transmission process, the control unit 102 can display a list of related image files on the display unit 107 and provide that list to the user. Furthermore, as illustrated in FIG. 12C, the control unit 102 can have the user confirm whether or not to also transmit the related image files. In this case, when the user selects "NO", the control unit 102 transmits the e-mail with just the image file received in step S302.

FIG. 11 is a flowchart illustrating the steps of the related image file transmission process. The control unit 102 acquires the image file to be transmitted from the memory unit 104 (step S401). Here, immediately after starting the related image file transmission process, the image file that was received in step S302 in FIG. 10 becomes the image file to be transmitted. After acquiring the image file to be transmitted, the control unit 102 transmits the e-mail to which that image file has been attached to the destination that was received in step S301 in FIG. 10 (step S402).

Next, the control unit 102 determines whether or not there are any image files that have not been transmitted (step S403). When there are image files that have not been transmitted (step S403: YES), the control unit 102 acquires the next image file to be transmitted from the memory unit 104 (step S401). On this occasion, when there is a plurality of image files that have not been transmitted, the control unit 102 acquires the image file in order of smallest image ID (or in other words, ascending order) as the image file to be attached. The control unit 102 then transmits the e-mail to which the image file has been attached to the destination (step S402).

When there are no image files that have not been transmitted (step S403: NO), the control unit 102 transmits the image file information for each of the transmitted image files as the transmitted image management information (step S404) and ends this process. For example, when the user selects image file "MImg0001.mp4", the image files are transmitted in the order "MImg0001.mp4"→"MImg0002.mp4"→"MImg0003.mp4" to the destination (for example, "@def.com") by the related image file transmission process above. Moreover, the transmitted image management information in that case is the same as that in the image management table 202 illustrated in FIG. 4. The contents of the transmitted image management information are not limited, and could at least also include the playback order of the transmitted image files.

There are various forms for transmitting the transmitted image management information. For example, the transmitted image management information does not have to be transmitted after transmission of all of the image files as in this exemplary embodiment, and could be transmitted before transmission of the image files. In addition, instead of transmitting the transmitted image management information separate from the image files, the control unit 102 can embed the transmitted image management information corresponding to an image file in the header section of that file, and do that for each image file then transmit the image files. Moreover, the control unit 102 can embed the transmitted image management information in the header section of the video data that is stored in the image file, and transmit the image file.

Figure 13A:
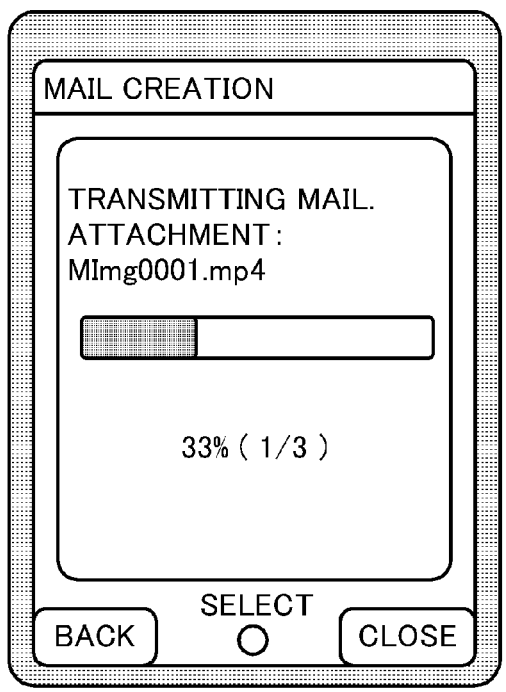
FIG. 13A is a diagram illustrating a display screen example during transmission of an image file.

FIG. 13A is a diagram illustrating an example of the display screen when in step S402 an e-mail with the first image file (for example, "MImg0001.mp4") is attached. In FIG. 13A, the progress status of the e-mail transmission is displayed in the center of the screen using a progress bar. In this example, instead of indicating the transmission status of the e-mail to which "MImg0001.mp4" is attached, this progress bar indicates the transmission status of "MImg0001.mp4" and all of the image files related to it. In other words, FIG. 13A illustrates the total progress status of when three e-mails, e-mail 1 to which "MImg0001.mp4" is attached, e-mail 2 to which "MImg0002.mp4" is attached and e-mail 3 to which "MImg0003.mp4" is attached, are transmitted.

Figure 13B:
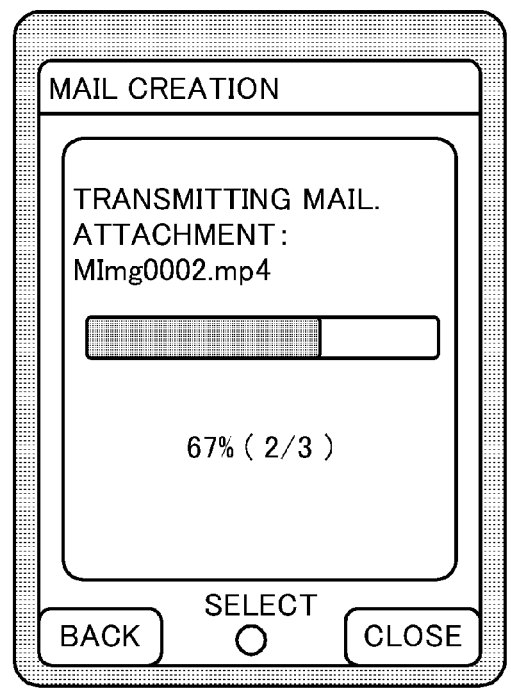
FIG. 13B is a diagram illustrating a display screen during transmission of an image file.

FIG. 13A is an example of the display during transmission of the first e-mail (email 1 above) of the three e-mails, so the progress bar indicates ⅓ of 100%, or in other words 33%. FIG. 13B is an example of the display during transmission of the second e-mail (email 2 above) of the three e-mails, so the progress bar indicates ⅔ of 100%, or in other words, 67%.

Continuing, the process of playing back an image file saved in the memory unit 104 (video playback process) will be explained. FIG. 14 is a flowchart illustrating the steps of the video playback process. The user starts the video playback process by using the operation unit 101 to perform the video playback operation. More specifically, the user can start the video playback process by selecting an item such as [Camera]→[Video Playback] from a menu screen that is displayed on the display unit 107. The video playback process can also be immediately started by pressing a certain key button such as a shortcut key.

The control unit 102 responds to the video playback operation that was inputted by the user, and executes a preparation process (playback preparation process) for playing back video (step S501). The control unit 102 performs processes such as initializing the various devices that are necessary for video playback, switching the display of the display unit 107 to the video playback display, and the like as the playback preparation process.

Based on the result of the playback preparation process above, the control unit 102 determines whether or not video playback is possible (step S502). Video playback is not possible, for example, when there are no image files saved in the memory unit 104, when it is not possible to use a device necessary for video playback for some reason, and the like. In this way, when video playback is not possible (step S502: NO), the control unit 102 displays an error message on the display unit 107, such as "Video recording is not possible," to notify the user that video playback is not possible (step S503).

When video playback is possible (step S502: YES), the control unit 102 receives an instruction from the user specifying the image file to be played back (step S504). For example, the control unit 102 displays a list of file names or thumbnails of the image files that are saved in the memory unit 104 on the display unit 107. The user selects the image file to be played back from the image files that are displayed as playback candidates. The judgment described in step S502 above can also be performed after the user selects the image file to be played back. For example, due to some kind of trouble during recording there is a possibility that the image file selected by the user cannot be played back, or the image files stored in an external memory 112 are in a format not supported by the communication terminal device 10.

After receiving the instruction from the user specifying the image file to be played back, the control unit 102 performs control such as changing the status of all of the devices from the playback preparation state to the playback start state. More specifically, the control unit 102 references the image management table 202 that is stored in the memory unit 104 and acquires image file information for the image file that the user selected (step S505).

Moreover, the control unit 102 plays back the image file that the user selected (for example MImg0001.mp4) by controlling the multiplexing/demultiplexing unit 109 (step S506). When doing this, the control unit 102 performs playback control based on the contents of the acquired image file information.

After playback has reached the end of the image file, the control unit 102 determines whether or not there are any image files that have not yet been played back (step S507). That is, the control unit 102 determines whether or not there are any images after the current image file that are to be played back. More specifically, the control unit 102 references the item "related files" in the image file information acquired is step S505, and checks the set image ID. When there are image IDs in ascending order from the current image file, the control unit 102 determines whether there are any image files that have not been played back.

As a result of the judgment, when there are no image files that have not been played back (step S507: NO), the control unit 102 ends the video playback process. However, when there are image files that have not been played back (step S507: YES), the control unit 102 searches for image file information from the image management table 202 that corresponds to the next image ID, and sets the next image file (for example MImg0002.mp4) to be played back (step S508). The control unit 102 also plays back that image file (step S506).

After that, the process above is repeatedly executed until the result of the judgment in step S507 becomes NO. As a result, for example, the image files are played back in order "MImg0001.mp4"→"MImg0002.mp4"→"MImg0003.mp4".

By performing the video playback process above in this way, the communication terminal device 10 can continuously playback one or a plurality of image files that are related to the image file that the user selected.

As explained above, with the communication terminal device 10 of this exemplary embodiment, when recording a video, the capacity of the image file that stores video data is set in consideration of the limit capacity for e-mail reception at the predetermined destination (communication destination) where the image file is to be transmitted. Therefore, the image file of the recorded video can certainly be transmitted to the communicating party.

Moreover, when a series of videos is separated and stored in a plurality of image files when recording a video, the communication terminal device 10 generates and manages information that indicates the relationship between these image files. Therefore, when playing back a video, the communication terminal device 10 can play back these image files in the correct order and can accurately play back a recorded video. In addition, when transmitting image files to another communication terminal device, the communication terminal device 10 also transmits the information indicating the relationship of the image files, so that the communication terminal device on the receiving side can also playback a video with no problems.

The present invention is not limited to the exemplary embodiment described above, and of course various changes are possible within a range that does not depart from the scope of the invention.

For example, in a strict sense, the capacity of an e-mail is affected by not only the capacity of an attached image file, but also by the amount of text of the e-mail message. However, in regards to this point, the estimated capacity of an e-mail message can be subtracted in advance from the limit capacity in the capacity limit information that is set in the capacity limit table 201 (see FIG. 3). For example, in the case where the limit capacity for transmission is 3 MB and the maximum estimated capacity of an e-mail message is 0.1 MB, the limit capacity set in the capacity limit table 201 can be set as 2.9 MB or less. The maximum capacity of an e-mail message can be estimated accurately by limiting the amount of text that can be entered. In this case, the estimation accuracy can be further improved by setting the title and message that are used when transmitting related image files.

In addition, by applying the program executed by the communication terminal device 10 of the exemplary embodiment described above to an existing portable telephone or the like, that portable telephone can be made to function as the communication terminal device 10 of the present invention.

The method for distributing such a program is arbitrary, for example, the program can be stored on a recording medium that can be read by a computer such as CD-ROM (Compact Disk Read Only Memory), DVD (Digital Versatile Disk), MO (Magneto Optical Disk), memory card and the like, and distributed, or can be distributed via a communication network such as a portable telephone network or the Internet.

Moreover, another communication terminal device that receives image files and transmitted image management information that is transmitted from the communication terminal device 10 of the exemplary embodiment above does not need to comprise the same functions as the communication terminal device 10. In other words, the other communication terminal device can comprise any function as long as it comprises at least a function capable of playing back received image files based on the received transmitted image management information. Furthermore, when transmitting image files, the communication terminal device 10 can be such that it transmits a program for video playback together with the image file to the communication terminal device at the destination.

(Further exemplary embodiment 1) A communication terminal device, comprising:

imaging units for taking an image of an object;

e-mail transmission/reception units for transmitting or receiving e-mail;

operation units for receiving operations from a user;

video data storage units for storing video data that is obtained as a result of taking images by the imaging units;

capacity limit information memory units for storing capacity limit information wherein the maximum transmittable capacity when transmitting e-mail is set;

video data writing units that, when the operation units receives a video recording instruction operation from a user, opens a new image file and writes video data that is stored in the video data storage units to that image file;

image memory units for storing the image file;

image file capacity monitoring units for monitoring the capacity of the image file that is stored in the image memory units;

capacity judgment units for determining whether or not the image file has reached the maximum transmittable capacity based on the monitoring results by the image file capacity monitoring units; and first information generation units that, when a plurality of image files are generated for one video, generates related image file information that stores information indicating the playback order of each image file, and stores the related image file information in the image memory units; wherein when the capacity judgment units determines that the image file has reached the maximum transmittable capacity, the video data writing units closes that image file and opens a new image file, then writes the video data that is stored in the video data storage units to that opened image file.

(Further exemplary embodiment 2) A recording medium that is readable by a computer whereon a program is recorded that causes a computer to execute steps of:

acquiring image files in order from the image memory means of a video that was specified by a user based on related image file information, wherein information indicating the playback order of the plurality of image files stored in the image memory means is stored, when the operation means receives a video playback instruction from the user; and causing a playback means to play back in order the acquired image files.

What is claimed is:

1. A communication terminal device, comprising:

an imager for taking an image of an object;

an e-mail transmitter/receiver for transmitting or receiving an e-mail;

an operator for receiving operations from a user;

a video data buffer for storing video data that is obtained as a result of taking images by the imager;

a capacity limit information memory for storing capacity limit information wherein a maximum transmittable capacity when transmitting e-mail is set;

a video data writer that, when the operator receives a video recording instruction operation from a user that initiates video recording, opens a first image file and copies video data from the video data buffer to the first image file for as long as the video recording takes place;

an image memory for storing the first image file;

an image file size monitor for monitoring, while the video recording is taking place, an amount of data of the first image file;

a capacity determiner that determines, while the video recording is taking place, whether or not a size of the first image file has reached the maximum transmittable capacity, based on the monitoring results by the image file size monitor; and a first information generator that, when a plurality of image files are generated for one video, generates related image file information that stores information indicating the playback order of each of the image files, and stores the related image file information in the image memory, wherein, when the capacity determiner determines during the video recording that the first image file has reached the maximum transmittable capacity, the video data writer closes the first image file, opens a second image file, and then writes the video data that is stored in the video data storage to the second image file, and wherein information indicating a communication destination is further set in the capacity limit information, and a plurality of different capacity limit information for each communication destination is stored in the capacity limit information memory.

2. The communication terminal device according to claim 1, wherein the capacity determiner performs judgment using the maximum transmittable capacity that corresponds to a communication destination selected based on specified conditions.

3. The communication terminal device according to claim 2, wherein the capacity determiner references the e-mail communication history, selects a communication destination having the highest frequency of transmitting or receiving e-mail within a specified period of time, and performs judgment using the maximum transmittable capacity that corresponds to the selected communication destination.

4. The communication terminal device according to claim 2, wherein the capacity determiner references the e-mail communication history, selects a communication destination transmitted or received e-mail most recently, and performs judgment using the maximum transmittable capacity that corresponds to the selected communication destination.

5. The communication terminal device according to claim 1, further comprising:

a transmission image file acquirer that, when the operator receives a video transmission instruction from a user, acquires the image files in order from the image memory for one video that was specified by the user based on the related image file information; and a transmitted image management information generator that, when there is a plurality of image files for a video, generates transmitted image management information based on the related image file information, wherein, each time the transmission image file acquirer acquires an image file, the e-mail transmitter/receiver transmits an e-mail to which only said image file is attached to a specified destination, and when there is a plurality of image files for said video, transmits the generated transmitted image management information to the specified destination using e-mail.

6. The communication terminal device according to claim 5, further comprising:

a transmission possibility determiner that, when the operator receives a video transmission instruction from a user, determines whether or not it is possible to transmit an image file of a video indicated by the video transmission instruction to the specified destination, wherein the image file for said video is transmitted to the specified destination only when the transmission possibility determiner determines that transmission is possible.

7. The communication terminal device according to claim 5, wherein the e-mail transmitter/receiver attaches the transmitted image management information to an e-mail and transmits that e-mail to the specified destination.

8. The communication terminal device according to claim 5, wherein the e-mail transmitter/receiver stores the transmitted image management information in the header section of at least an e-mail to which the image file is attached.

9. A non-transitory recording medium that is readable by a computer whereon a program is recorded that causes a computer to execute steps of:
- starting imaging by an imager when an operator receives a video recording instruction from a user for initiating video recording;
- storing video data that is obtained as a result of imaging in a video data buffer;
- opening a first image file;
- copying video data that is stored in the video data buffer to the first image file for as long as the video recording takes place;
- monitoring, while the video recording is taking place, an amount of data of the first image file;
- determining, while the video recording is taking place, whether or not a size of the first image file has reached a maximum transmittable capacity when transmitting an e-mail, the maximum transmittable capacity being stored as a capacity limit information in a memory that stores information of at least one communication destination and a plurality of different capacity limit informations for each communication destination;
- while the video recording is taking place, closing the first image file and opening a second image file when it is determined during the video recording that the first image file has reached the maximum transmittable capacity, and writing video data that is stored in the video data buffer in the second image file; and
- generating related image file information, wherein information indicating the playback order of image files is stored, when a plurality of image files are generated for the video recording.

10. A non-transitory recording medium that is readable by a computer, whereon a program is recorded that causes a computer to execute steps of:
- starting imaging by an imager when an operator receives a video recording instruction from a user that initiates video recording;
- storing video data that is obtained as a result of imaging in a video data buffer;
- opening a first image file, and while the first image file is open and for as long as the video recording takes place, performing the steps of:
  - writing video data that is stored in the video data buffer to the open first image file;
  - monitoring a total amount of data of the open first image file;
  - determining whether or not a size of the first image file has reached a maximum transmittable capacity for transmitting an e-mail, the maximum transmittable capacity being stored as a capacity limit information in a memory that stores information of at least one communication destination and a plurality of different capacity limit informations for each communication destination, and in the event of a determination that the first image file has reached the maximum transmittable capacity, performing the sub-steps of
    - closing the first image file, and
    - opening a second image file in order to write thereto video data that is stored in the video data buffer and subsequent to the video data written to the first image file; and
- in the event that a plurality of image files are generated for the video, generating related image file information containing information indicating a playback order of said image files.

* * * * *